United States Patent [19]

Young, II

[11] 4,182,269
[45] Jan. 8, 1980

[54] INCUBATOR FOR SALMONID EGGS AND ALEVIN

[76] Inventor: Dale E. Young, II, Rte. 4, Box 4915-1, Juneau, Ak. 99803

[21] Appl. No.: 873,204

[22] Filed: Jan. 30, 1978

[51] Int. Cl.² .............................................. A01K 61/00
[52] U.S. Cl. ....................................................... 119/3
[58] Field of Search ............................................. 119/3

[56] References Cited

U.S. PATENT DOCUMENTS

| | | | |
|---|---|---|---|
| 136,834 | 3/1873 | Holton | 119/3 |
| 376,553 | 1/1888 | Sandford | 119/3 |
| 3,870,018 | 3/1975 | Fruchtnicht | 119/3 |
| 4,014,293 | 3/1977 | Salter | 119/3 |

Primary Examiner—Hugh R. Chamblee
Attorney, Agent, or Firm—Ford E. Smith; David L. Garrison

[57] ABSTRACT

Incubation apparatus for use in hatching salmonid eggs in the production of the intermediate stage alevins and the ultimate fish fry is provided. Incubation trays are stacked in a container to which hatchery water is supplied and from which it departs, in the interval passing through the trays and their contents of substrate material and the eggs and/or alevins. The trays are designed to create desirable currents in water flow to facilitate dissipation of gaseous bubbles and, when the time comes, to urge and direct the outward movement of the fry.

14 Claims, 6 Drawing Figures

INCUBATOR FOR SALMONID EGGS AND ALEVIN

STATEMENT OF THE INVENTION

This invention is primarily directed at providing a healthy environment in which the incubation of salmonid eggs as embryos is safely and efficiently conducted and in which the maturation of the hatched embryos, i.e. alevins, into fry can best occur. A serious problem tackled by this invention is the handling of the many gases present in hatchery waters. Nitrogen and oxygen are the two most abundant gases with the nitrogen content being normally about twice the oxygen content. Other gases present include carbon dioxide at lower concentrations, and naturally-occurring gases such as ammonia, methane or hydrogen sulfide. On occasion hatchery waters have been found to be supersaturated with inert gases, especially nitrogen and occasionally zenon, krypton, argon and neon.

When alevins are exposed to water supersaturated with gases such as these, they absorb the gases into their body fluids. Under appropriate hydrostatic conditions, the gases may be released from solution and form bubbles within the alevins. Such bubbles tend to accumulate in body cavities and form embolisms which cause blindness or internal illness or even kill the alevins. It is one of the principal objects of this invention to provide incubation equipment in which gases that have come out of solution and tend to form into bubbles are directed in such manner as to rapidly dissipate from the apparatus with little or no contact with the alevins.

When the gases come out of solution from the water, they form into minute bubbles which tend to accumulate and agglomerate under trays or baskets. Often large bubbles result. When these reach the limit of surface tension or are pricked, they burst with substantial force often to disruption of the egg stratum being hatched or to the alevins in the vicinity. It is another important object of this invention to reduce, if not wholly eliminate, the accumulation of gas bubbles and their growth into deleterious sizes.

A further object of this invention has been the provision of incubation and hatching apparatus which is extremely compact, without at the same time creating overcrowding conditions; which is most efficient to the end that the highest hatch potential is attained; and which is simple to discharge once incubation of the alevins has been completed and the maturation begins.

DESCRIPTION OF THE PREFERRED EMBODIMENT

Figure 1:
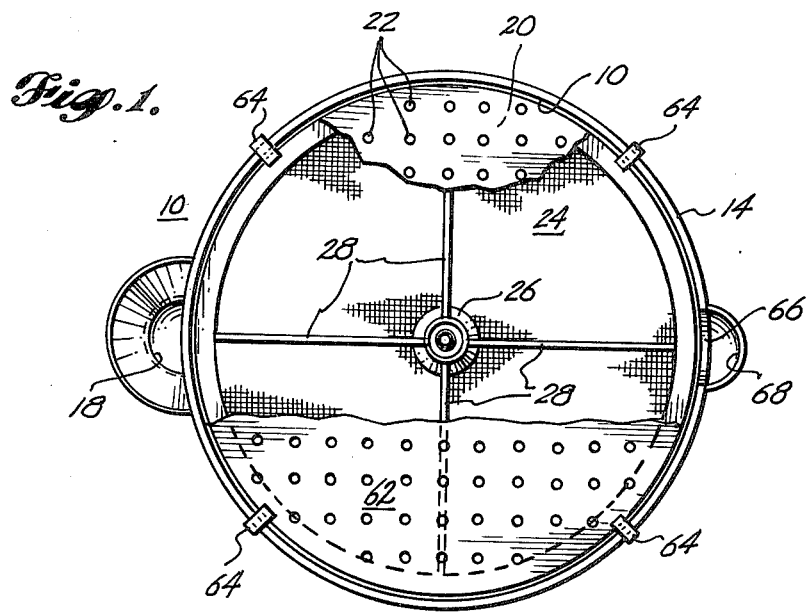
FIG. 1 is a plan view of an incubator.
Figure 2:
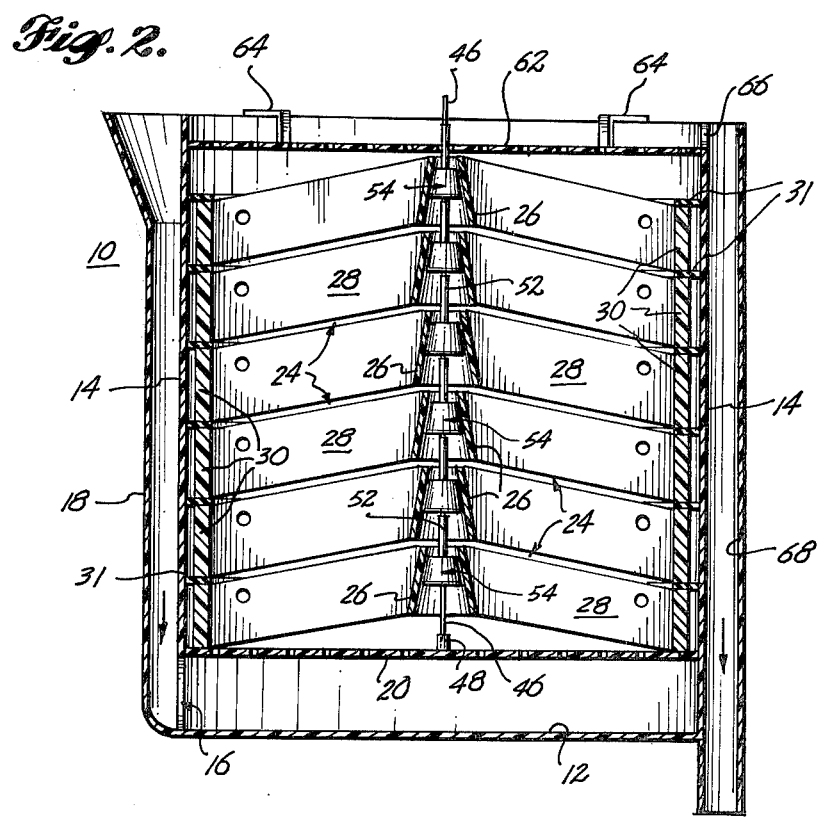
FIG. 2 is a vertical sectional view of an incubator.

The incubator chamber 10 is formed with bottom 12 and upright walls 14, 14 rising thereabove. While the incubator chamber may be formed of a plurality of angularly disposed walls, it is preferred that the chamber be circular in cross-section for reasons to become clear during the description that follows. Inlet port 16 at the bottom of inlet pipe 18 opens into the lower portion of chamber 10 beneath the pressure plate 20.

Plate 20 is perforated with a multitude of holes 22 distributed evenly thereover. Supply water entering through port 16 passes upward through the holes 22 to form an upwelling flow through the stacked trays 24 above plate 20.

Each tray 24 comprises a central hub 26 from which radiate frame arms 28. The outer ends of the frame arms are encircled by the enclosing wall 30. Each tray bottom 32 is foraminous and comprises a panel of fine mesh screen desirably about 10 mesh stainless steel screen formed of 0.035" wires. Preferably the tray bottoms 32 are slightly conical rising from the underside of the encircling wals 32 axisward to join and be attached to the lower outer surfaces of the elevated hubs 26. A groove 34 receives an upturned flange 36 of foraminous bottom 32 where it is secured by an anchor cord 38 forced into groove 34 along with a fold of the screen flange 36.

Likewise the outer periphery of screen bottom 32 has a flange 40 which is secured in groove 42 on the inner surface of enclosing wall 30 by means of anchor cord 44. Gaskets 31 between adjacent trays bear on the inner wall of chamber to eliminate water by-passing the trays and the substrates.

The central hub 26 of each tray is hollow and has a converging inner wall 27 forming a conical passage 50 smaller at the top than at the bottom, as shown. An aligning rod 46 extends from a seat 48 in the lower portion of the incubation chamber 10 upward through the conical hub passages 50 of the several trays in the stack. Attached to tubes 52 slideable on rod 46 are frusto-conical hollow members 54 normally during incubation being seated in the respective hub passages 50. The inner wall 27 of each hub comprises a valve seat and the outer surface of a member 54 comprises a valve plug.

Plug members 54 are hollow and have screened openings 56 and 58 top and bottom to permit the passage therethrough of water and water-borne gases in the form of bubbles, but to preclude the passage of any solid or organic matter, specifically egg cases, alevins or fry. A yoke 60 is attached to the lower end of a tube 52 and to bottom edges of the plug as shown.

Preferably, the plug members 54 are buoyant, being formed of wood or a low density plastic material which will float. When the incubator is in operation, the plug members are biased upward in passages 50 and prevent the passage of solid matter, but at the same time permit water and air or gases to pass. When downward pressure is applied to several plugs 54, a substantially-sized, conical solids escape passage develops between each plug and the surrounding passage wall 27 of the related hub.

Overlying the stack of trays near the top of chamber 10 is perforate shear plate 62, perforated much like plate 20. Hangers 64 rise around the edge of plate 62 and hook over the upper edge of the tank walls 14. The upwelling water column impinges on the bottom of plate 62 with the water escaping smoothly upward and laterally through the holes in the plate in a flow shearing action toward the outlet.

Tank wall 14 has overflow notch 66 which permits effluent water to flow into outlet passage 68 for suitable disposal.

Figure 3:
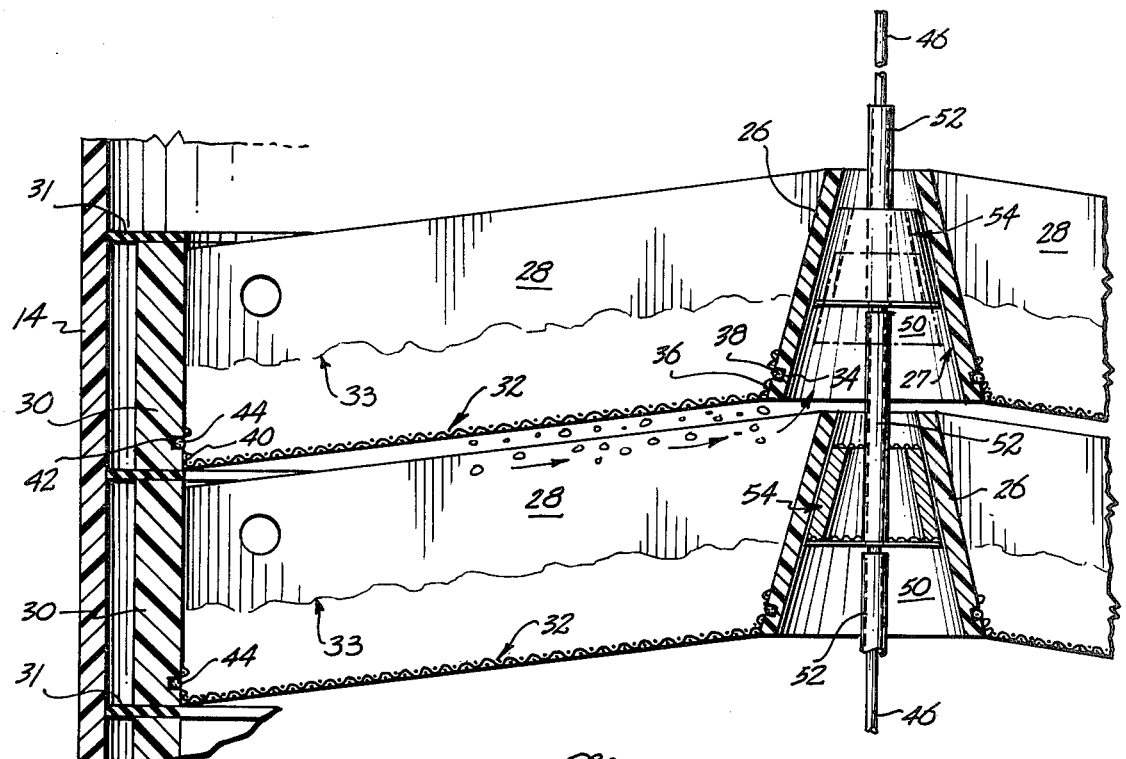
FIG. 3 is an enlarged fragmentary cross-section of a portion of a tray.
Figure 4:
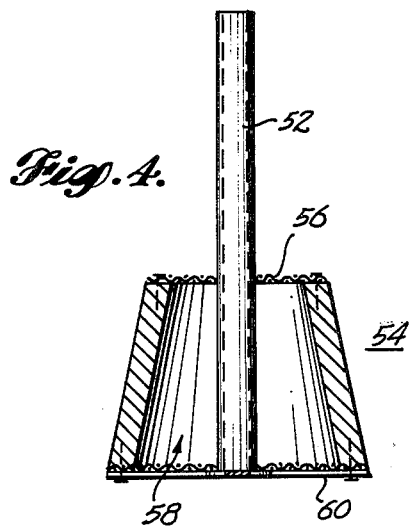
FIG. 4 is a vertical section of a valve member.
Figure 6:
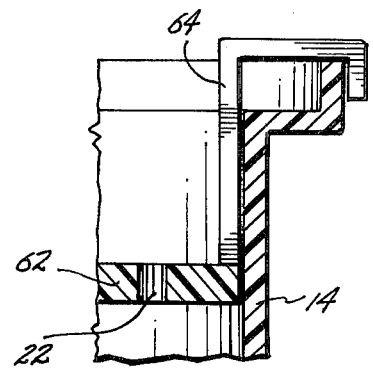
FIG. 6 shows how an upper pressure plate is suspended with the receptacle.
Figure 5:
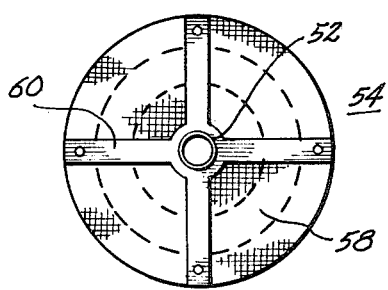
FIG. 5 is a bottom plan view of the valve of FIG. 3.

For incubation purposes, the stacked trays are each provided with a substrate indicated by numeral 33 in FIG. 3 on which salmonid eggs are initially placed. As the eggs develop into alevin, the latter seek shelter in the substrate. Gravel is a natural substrate although excessively heavy. Synthetic turf and corrugated screens have been used for substrate material. Another very satisfactory substrate is obtained by depositing a bed of packings, such as are used in packed columns in the chemical industry, on and in which alevins can incubate.

The chamber 10 is preferably provided without corners, i.e., cylindrical, because it has been found that during incubation the alevin and the fry tend to accumulate in backwater areas of corners where they smother and die, presumably because there are backwater currents produced due to the non-circular shape of the upward welling water column.

It appears to be a peculiarity of upward rising columns of water passing through screens for air and other gas bubbles to form on the underside of the screen due to surface tension. Such bubbles, at first minute, grow into substantial size and become quite forceful. When such large bubbles finally rupture or burst or purge, upward forces ar released which deleteriously tumble the overlying eggs and alevin. The slightly conical shape of the tray bottoms and water currents flowing thereunder tend to induce such air bubbles to migrate axisward of the incubation chamber and into the hollow hub whence they escape harmlessly upward.

In addition to their effect in producing bubble migration axisward, the sloping bottoms of the trays and, hence, the upward slope of the substrate thereon tends to produce currents in the water to urge the fry axisward during discharge at the end of the incubation period and to facilitate emptying the incubator through the hollow hub.

An incubator as described herein had the following dimensions:
diameter of the trays—ca 40+inches
tray depth—ca 6 inches
main chamber (outside)—42 inches
inlet chamber (height)—6 inches
container (height)—ca 48 inches
inlet port—6"×6"
stack of trays (height)—ca 40 inches
hub passage (bottom)—4½ inches
hub passage (top)—2 inches
valving plug (height)—ca 2½ inches
valving plug (bottom diam.)—3½ inches

GLOSSARY OF TERMS

Embryo—The organism in its early development stage, especially before hatching when it depends on its own yolk for nutrition.

Eyed egg—When the eye is visible through the egg shell.

Alevin—Larval salmon from the time of hatching to the absorption of the yolk.

Fry—Juvenile salmon following the alevin stage and the absorption of the yolk—fry are organisms ready for active feeding.

Incubator—A device for the artificial rearing of salmon organisms from fertilization to the release or volitional emigration of the fry.

Volitional Emigration—The natural and voluntary emigration of the fry from the environment in which it existed during the alevin stage to an environment where the fry may engage in active feeding.

Diffuser—A perforate plate or shelf in a rising column of water which smooths and diffuses the same to provide an upwelling flow or flood of water.

Substrate—Is also called the incubator matrix and constitutes a mass comprising a multitude of interstices or in which eggs may hatch to produce alevins and in which interstices the alevins exist during the absorption of the egg shell.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. An incubator for salmonid eggs and alevin, comprising:
   means forming a water inlet chamber including a supply port thereto;
   a stack of foraminous-bottom incubation trays rising above said chamber;
   means for supplying water and distributing the same to said stack and with such force as to maintain an upwelling flow throughout said stack of trays;
   said trays including substrate means to shelter the alevin during its development into fry;
   each try having a centrally located hollow hub provided with an internal valve seat;
   gate means in each hub cooperable with the internal seat thereof and adapted to restrict upward passage through the hub to water and water-borne gases; and
   mean for unseating said gate means to permit the volitional migration upward of fry past said valve seats toward the top of said stack.

2. The structure according to claim 1 in which the perforate bottoms of the trays are conical and rise axisward to join the bottom of the hollow hub.

3. The structure of claim 1 in which the hollow hub has a conical valve seat the the gate means includes a conical surface cooperable with said seat.

4. The structure of claim 1 in which the gate means are upwardly biased in a common axis and the means for unseating said gate means is a downwardly operable valve stem.

5. The structure according to claim 4 in which the gate means are buoyant.

6. The structure according to claim 3 in which the each gate means comprises a hollow frustrum the lower end of which is spanned by a screen.

7. The structure according to claim 1 in which there is a perforate water distributor member between the inlet chamber and the underside of the stack of trays.

8. The structure according to claim 7 in which there is a perforate water flow shear member overlying said stack of trays.

9. An incubator for fish eggs, comprising:
   wall means providing a cylindrical incubation chamber having a lower water inlet and an upper effluent outlet;
   a stack of foraminous-bottom, circular incubation trays filling said chamber above said lower water inlet in such manner that substantially all incoming supply water passes upward through said stack;

said trays including substrate means to shelter alevin during its development into fry;

the foraminous bottom of each tray being conical and surrounding a centrally located hollow hub having an internal downwardly flaring valve seat;

a buoyant frusto-conical gate member in each hub operatively fitted to the internal valve seat thereof and adapted to restrict upward passage to water and gases; and means for unseating said gate members to permit the upward volitional migration of fry past said valve seats in the direction of the top of the stack of trays.

10. The structure according to claim 9 in which said substrate comprises a multitude of discrete members forming and providing alevin sheltering interstices.

11. An incubator for salmonid eggs and alevin, comprising:

a vessel provided with an upwelling flow of water;

a foraminous conical bottom incubator tray fitted to said vessel so that said upward welling flow passes through said tray in a substantially uniform manner normal thereof;

said tray including means forming a central passage extending from beneath said tray to thereabove;

means forming an incubation substrate on said tray above its foraminous bottom; and screened gate means in said central passage to permit upward venting of gasses in said upwelling flow of water, said screened gate means being displaceable to permit the upward movement of solid matter in said central passage.

12. An incubator for salmonid eggs and alevin, comprising:

a vessel provided with an upwelling flow of water;

a stack of foraminous bottom incubator trays within said vessel;

each tray having a hollow hub centrally located and forming a passage from beneath to above each tray, the hubs in said stack being spaced apart;

means forming an incubation substrate on each said tray above its foraminous bottom and beneath the upper extremity of said central passage; and gate means in each passage operable to permit upward volitional migration of fry from beneath said trays.

13. An incubator for salmonid eggs and alevins, comprising:

a vessel having an inlet and an outlet and provided with a continuous upwelling flow of water therebetween;

a slanted foraminous surface located in said vessel in said upwelling flow, said slanted surface supporting an incubation substrate;

means forming a vent passage adjacent the upper extremity of said slanted surface from therebeneath to above said substrate; and;

said vent passage including gate means adapted to permit venting of gases in said passage, but blocking the upward movement of solid matter therethrough.

14. The structure according to claim 13 in which there is a plurality of superposed slanted, substrate-included, foraminous surfaces in said vessel and said vent passage extends from beneath the lowermost of said surfaces and is adapted to vent the underside of each surface.

* * * * *